(12) United States Patent
Mayzou et al.

(10) Patent No.: US 6,314,981 B1
(45) Date of Patent: Nov. 13, 2001

(54) DEVICE FOR CONNECTING AND TRANSFER OF FLUID BETWEEN A SUPPLY RESERVOIR AND A RECEIVING RESERVOIR

(75) Inventors: Jean Mayzou, Pont Château (FR); Paul Jullien; Pierre Marnas, both of Kourou (GY); Robert Wallez, Fontenay-aux-Roses (FR)

(73) Assignee: L'Air Liquide, Societe Anonyme pour l Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/436,037

(22) Filed: Nov. 8, 1999

(30) Foreign Application Priority Data

Nov. 6, 1998 (FR) .................................................. 98 14024

(51) Int. Cl.$^7$ ....................................................... F17C 7/02
(52) U.S. Cl. ........................ 137/15.04; 137/239; 137/572; 62/114
(58) Field of Search .................................... 137/239, 571, 137/572, 238, 15.04; 62/114

(56) References Cited

U.S. PATENT DOCUMENTS

| | | |
|---|---|---|
| 4,856,284 | 8/1989 | Mattiola et al. . |
| 5,495,875 | 3/1996 | Benning et al. . |
| 5,681,613 | 10/1997 | Hansen . |
| 5,802,859 | * 9/1998 | Zugibe .................................. 62/125 |

FOREIGN PATENT DOCUMENTS

| | | |
|---|---|---|
| 0 463 265 | 1/1992 | (EP) . |
| 2 219 373 | 9/1974 | (FR) . |

\* cited by examiner

*Primary Examiner*—Kevin Lee
(74) *Attorney, Agent, or Firm*—Young & Thompson

(57) ABSTRACT

Process and device for connecting at least one supply reservoir (A), such as a storage reservoir, to at least one receiving reservoir (B), such as a tank truck, for the transfer of a fluid from the at least one supply reservoir (A) to the least one receiving reservoir (B) comprising at least one transfer line (2) for fluid comprising at least one first member (3) for connection to the receiving reservoir (B); a valve ($V_2$) for connection to the atmosphere connected to the transfer line (2); and an analyzer (10) connected to the transfer line (2) particularly to monitor continuously during the transfer the purity of the transferred fluid.

19 Claims, 1 Drawing Sheet

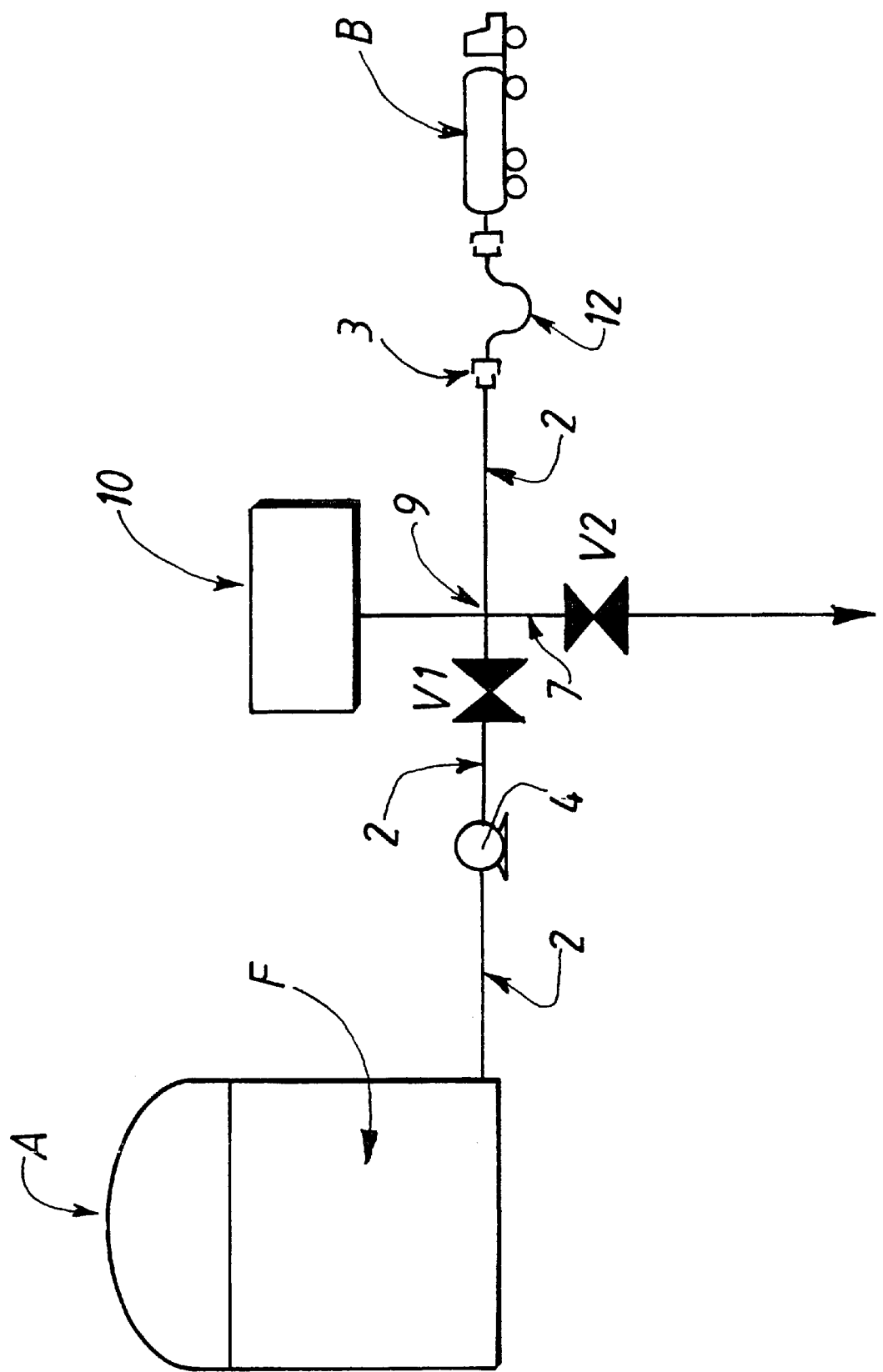

DEVICE FOR CONNECTING AND TRANSFER OF FLUID BETWEEN A SUPPLY RESERVOIR AND A RECEIVING RESERVOIR

FIELD OF THE INVENTION

The present invention relates to a device for connecting at least one supply reservoir, such as a storage reservoir, to at least one receiving reservoir, such as a tank trunk, and a process for a transfer of fluid, in particular cryogenic fluid, between said supply and receiving reservoirs.

BACKGROUND OF THE INVENTION

It is known that the transfer of a fluid, particularly a cryogenic fluid, such as nitrogen, between a supply reservoir and a receiving reservoir is apt to give rise to more or less great pollution of the fluid thus transferred by impurities likely to be found in the connection means connecting the two reservoirs, and such as conduits and other flexible connection members.

For reasons of quality control, it is desirable to be able to minimize the pollution of the fluid transferred, by such impurities, in particular when the fluid is destined for uses requiring a high purity fluid, for example ultra-pure nitrogen destined to be used in the electronic field.

SUMMARY OF THE INVENTION

The object of the present invention is thus to provide a process and a device permitting guaranteeing minimum contamination of a fluid during its transfer from a supply reservoir to a receiving reservoir or receiver, in particular a cryogenic fluid such as nitrogen.

The present invention thus relates to a device for connecting at least one supply reservoir to at least one receiving reservoir for the transfer of a fluid from said at least one supply reservoir to said at least one receiving reservoir, comprising at least one fluid transfer line comprising at least one member for connecting to said receiving reservoir; a valve for connecting to the atmosphere connected to the transfer line; and an analyzer connected to the transfer line.

As the case may be, the device according to the invention can comprise one or several of the following characteristics:

- the analyzer is connected to the transfer line between the valve connected to the atmosphere and the first connection member of the transfer line;
- the analyzer and the valve connected to the atmosphere are connected by a single connection to the transfer line;
- at least the receiving reservoir is mobile, preferably selected from the group formed by tank trunks and tank cars;
- at least one control valve for the flow of fluid is arranged in the transfer line, preferably said control valve for the flow of fluid is arranged between the supply reservoir and the valve connecting to the atmosphere.

The invention moreover relates to a process for purging at least one portion of a transfer line for fluid, connecting at least one supply reservoir to at least one receiving reservoir, said transfer line comprising at least one connection with a valve for connecting to the air and an analyzer connected to the transfer line between the valve connecting to the air and a first connecting member of the transfer line to the receiving reservoir, comprising at least:

- a step of purging counter current the transfer line with the help of purge fluid from the receiving reservoir; and,
- a step of determining the content of at least one impurity in the purge fluid.

According to another aspect, the invention also relates to a process for transferring a cryogenic fluid from at least one supply reservoir to at least one receiving reservoir, in which there is carried out a purge of at least a portion of a transfer line connecting said supply and receiving reservoirs according to a purge process as described above.

As the case may be, the process for transfer according to the invention can comprise one or several of the following characteristics:

- the transfer of cryogenic fluid is begun for a purge fluid pressure greater than a predetermined pressure threshold and/or a content of impurities of the purge fluid below a predetermined threshold of impurities; said impurities threshold being in general a function of the nature of the fluid and of the standards to be observed, and can vary for example from several ppm to several ppb;
- during the transfer of the cryogenic fluid, there is determined, preferably continuously, the content of at least one impurity of the cryogenic fluid thus transferred;
- said cryogenic fluid is selected from the group consisting of rare gases, oxygen, hydrogen, carbon dioxide, nitrogen or their mixtures;
- the impurities are in the group formed by $CO_2$, CO or their mixtures;
- the predetermined pressure threshold is at least about $2\times10^4$.

BRIEF DESCRIPTION OF THE DRAWINGS

The invention will now be described in greater detail with the help of the accompanying drawing, given by way of illustration but not limitation.

The accompanying FIGURE is a schematic view of a device for connection according to the present invention permitting transferring a cryogenic fluid, for example nitrogen, between a supply reservoir A and a receiving reservoir or receiver B.

DETAILED DESCRIPTION OF THE INVENTION

In this case, the supply reservoir A is a cistern or a storage capacity and the receiving reservoir B is a mobile tank truck.

The connection device comprises a transfer line 2 connecting the supply reservoir A to the receiving reservoir B, which transfer line comprises a compressor 4 of valve $V_1$ to control the flow of fluid in the line 2, a valve $v_2$ for connecting to the atmosphere, and a connection member 3 of the line 2 to the receiving reservoir B directly or indirectly, which is to say by means of a connection means, such as a flexible connector 12.

The portion of transfer line 2 located between the valve $V_1$ and the connection member 3 is called the purge circuit.

When it is desired to carry out a transfer of a fluid F contained in the supply reservoir A toward the receiving reservoir B, there is first carried out, according to the invention, a purge of the portion of the transfer line 2 located between the valve $V_1$ and the connection means 3.

To do this, there is carried out a purge by gaseous countercurrent scavenging of the portion of the transfer line 2 to be purged with the aid of a residual gas contained in the receiving reservoir B.

The residual gas contained in the receiving reservoir B therefore leaves this reservoir B flowing through the flexible member 12 and through the purge circuit of the transfer line 2, before being evacuated to the atmosphere through the valve $V_2$ for connecting to the atmosphere, which is then in its open position.

The flow of the residual gas through the transfer line 2 gives rise to a gaseous sweeping of the latter and similarly an effective elimination of impurities that may be found there.

So as to guarantee that the content of undesirable impurities is minimal in the line 2, an analyzer 10, connected to the transfer line 2, continuously monitors the change in the content of one or several impurities that may be present in the transfer line 2 and/or in the flexible connector 12.

In fact, the analyzer 10 continuously monitors, during the gaseous purge, the content of impurities of the purge gas flow circulating countercurrent in the transfer line 2 between the connection member 3 and the valve $V_2$ for connecting to the atmosphere.

When the content of the purge gas in said impurity or impurities becomes lower than a predetermined threshold value, the purging flow is stopped, the valve $V_2$ for connecting to the air is closed, the valve $V_1$ is opened to permit flow of the fluid from the supply reservoir A to the receiving reservoir B.

Preferably, after purging, the valve $V_2$ is closed, the valve $V_1$ is opened and there is carried out an analysis, preferably continuously, of the fluid circulating in the transfer line 2 during all the duration of said transfer. This permits guaranteeing the quality and the purity of the fluid sent to and stored in the receiving reservoir B.

If necessary, to facilitate the flow of the fluid through the transfer line 2, it is desirable, or even in some cases necessary, to carry out a recompression of said fluid by means of a compressor 4 arranged in the line 2 upstream of the valve $V_1$.

By carrying out a purge of the transfer line 2 and/or of the flexible connector 12 connecting the reservoirs, prior to the beginning of the transfer proper of said fluid, it is possible to minimize the quantity of undesirable impurities incorporated in the fluid during transfer.

The device and the process according to the invention are applicable to cryogenic fluids in a gaseous or liquid phase, particularly oxygen, hydrogen, carbon dioxide, nitrogen or the rare gases.

Moreover, according to the invention, so as to guarantee a high purity of the gas or of the fluid transferred, prior to the countercurrent purge of the transfer line 2 with the aid of the purge fluid from the receiving reservoir B, there can preferably be carried out on the one hand, a determination of the content of impurities of said purge fluid contained in the receiving reservoir B, and a comparison of the value of the content of impurities of said purge fluid thus determined, with a predetermined purity threshold value; and on the other hand, a determination of the pressure of said purge fluid contained in the receiving reservoir B and a comparison of the value of the pressure thus obtained with a predetermined threshold pressure value.

Then the countercurrent purge of the transfer line 2 is begun, with the help of the purge fluid from the receiving reservoir B, only if the value of the impurity content in said purge fluid is below the predetermined purity threshold value, for example what an impurity such as nitrogen, oxygen, or argon, as the case may be, and/or only if the predetermined pressure value is greater than or equal to a predetermined threshold pressure value, for example a minimum pressure of 0.2 bar, so as to verify that the reservoir B, for example a tank truck, has maintained a residual atmosphere of fluid usable for the purging, which is to say that it has not been polluted by the entry of atmospheric air.

Preferably, both the pressure and the content of impurities of the gas or fluid contained in the reservoir B serving as the purge, are monitored. In this case, only a simultaneous agreement of these two parameters permits the operation of the fluid transfer pump.

Preferably, there is used a same analyzer to monitor the quality of the purge gas and to provide thereafter the quality of the gas transferred from the supply reservoir to the tank truck, and this until the end of filling.

Preferably, in addition to the loading sequences, the analyzer measure preferably continuously the quality of the product contained in the storage reservoir.

The process according to the invention is moreover particularly advantageous because it avoids carrying out quality controls after loading of the fluid, which is to say that it thus provides a substantial decrease of the cost of loading.

What is claimed is:

1. Device for connecting at least one supply reservoir to at least one receiving reservoir for transferring a fluid from said at least one supply reservoir to said at least one receiving reservoir, comprising at least:

a fluid transfer line comprising at least one first member for connecting to said receiving reservoir; said receiving reservoir being mobile;

a valve for communicating with the atmosphere connected to the fluid transfer line; and an analyzer connected to the fluid transfer line.

2. The device according to claim 1, wherein the analyzer is connected to the fluid transfer line between the valve for communicating with the atmosphere and the first member for connecting the fluid transfer line to the receiving reservoir.

3. The device according to claim 1, wherein the analyzer and the valve for communicating with the atmosphere are connected by a single connector to the fluid transfer line.

4. The device according to claim 1, wherein the mobile receiving reservoir is selected from the group consisting of tank trucks and tank cars.

5. The device according to claim 1, further comprising at least one control valve arranged in the fluid transfer line for controlling fluid flow.

6. The device according to claim 5, wherein the control valve for controlling fluid flow is arranged between the supply reservoir and the valve for communicating with the atmosphere.

7. Purge process for at least one portion of a fluid transfer line, connecting at least one supply reservoir to at least one receiving reservoir, said fluid transfer line comprising a valve for communicating with the atmosphere; a first member for connecting to said receiving reservoir; and an analyzer connected to the fluid transfer line between the valve for communicating with the atmosphere and the first member; the process comprising at least:

countercurrently purging said at least one portion of the fluid transfer line with a purge fluid from the receiving reservoir; and determining the content of at least one impurity in the purge fluid circulating in said at least one portion of said fluid transfer line.

8. Process for transferring a cryogenic fluid from at least one supply reservoir to at least one receiving reservoir, which comprises: carrying out a purge of at least one portion of a fluid transfer line connecting said supply reservoir and said receiving reservoir according to the purge process as claimed in claim 7.

9. The transfer process according to claim 8, wherein the transfer of cryogenic fluid is carried out after purging of the fluid transfer line.

10. The process according to claim 9, wherein the transfer of cryogenic fluid is begun to be carried out at a pressure of the purge fluid greater than a predetermined pressure threshold.

11. The process according to claim 9, wherein the transfer of cryogenic fluid is begun to be carried out at an impurities content of the purge fluid below a predetermined impurities threshold.

12. The process according to claim 8, further comprising continuously determining during the transfer of the cryogenic fluid, the content of at least one impurity of the cryogenic fluid being transferred.

13. The process according to claim 8, wherein the cryogenic fluid is selected from the group of rare gases, oxygen, hydrogen, carbon dioxide, nitrogen and mixtures thereof.

14. The process according to claim 8, wherein the impurities are selected from the group consisting of $CO_2$, CO and mixtures thereof.

15. The process according to claim 10, wherein the predetermined pressure threshold is at least $2 \times 10^4$ pa.

16. The process according to claim 9, further comprising, prior to the countercurrent purge of the fluid transfer line with the purge fluid from the receiving reservoir, carrying out:

a determination of the content of at least one of said impurities of said purge fluid contained in the receiving reservoir; and a comparison of the value of the content of at least one of said impurities of said purge fluid thus determined with a predetermined threshold purity value.

17. The process according to claim 9, further comprising, prior to the countercurrent purge of the fluid transfer line with the purge fluid from the receiving reservoir, carrying out:

a determination of the pressure of said purge fluid contained in the receiving reservoir; and a comparison of the pressure value thus determined with a predetermined threshold pressure value.

18. The process according to claim 16, further comprising, carrying out a countercurrent purge of the fluid transfer line with the purge fluid from the receiving reservoir, when the value of the content of at least one of said impurities of said purge fluid is below a predetermined threshold purity value.

19. The process according to claim 16, further comprising carrying out a countercurrent purge of the fluid transfer line with the purge fluid from the receiving reservoir, when the value of the pressure determined is greater than or equal to a predetermined threshold pressure value.

* * * * *